(12) United States Patent
Ford (10) Patent No.: US 9,517,841 B2
(45) Date of Patent: Dec. 13, 2016

(54) BALLISTIC POWERED INERTIA REEL

(71) Applicant: Carleton Life Support Systems, Inc., Davenport, IA (US)

(72) Inventor: Brian Ford, Bettendorf, IA (US)

(73) Assignee: Carleton Life Support Systems, Inc., Davenport, IA (US)

( * ) Notice: Subject to any disclaimer, the term of this patent is extended or adjusted under 35 U.S.C. 154(b) by 97 days.

(21) Appl. No.: 14/676,160

(22) Filed: Apr. 1, 2015

(65) Prior Publication Data

US 2016/0288915 A1 Oct. 6, 2016

(51) Int. Cl.
*B60R 22/34* (2006.01)
*B64D 25/02* (2006.01)

(52) U.S. Cl.
CPC .................... *B64D 25/02* (2013.01)

(58) Field of Classification Search
CPC .......... B60R 22/34; B60R 22/38; B64D 25/02
USPC ........... 242/374; 244/141; 297/480; 280/806
See application file for complete search history.

(56) References Cited

U.S. PATENT DOCUMENTS

| | | | |
|---|---|---|---|
| 3,077,324 A | 2/1963 | Strickland, Jr. | |
| 3,105,662 A | 10/1963 | Wrighton | |
| 3,178,136 A | 4/1965 | Bayer | |
| 3,189,296 A * | 6/1965 | Wrighton | B60R 22/4633 |
| | | | 242/374 |
| 3,386,683 A | 6/1968 | Howland | |
| 3,389,873 A | 6/1968 | Filippi et al. | |
| 3,522,918 A | 8/1970 | Wrighton | |
| 4,747,565 A | 5/1988 | Spinosa et al. | |
| 4,801,105 A | 1/1989 | Frisk | |
| 4,871,131 A | 10/1989 | Bernier et al. | |
| 4,955,556 A | 9/1990 | Frisk | |
| 5,056,739 A * | 10/1991 | LeVay | B64D 25/06 |
| | | | 244/122 AC |
| 5,746,395 A | 5/1998 | Peck et al. | |
| 5,788,176 A | 8/1998 | Ebner et al. | |
| 5,934,596 A | 8/1999 | Gorman et al. | |
| 6,155,513 A | 12/2000 | Smithson | |
| 6,412,875 B1 | 7/2002 | Hibata et al. | |
| 6,447,012 B2 | 9/2002 | Peter et al. | |
| 8,220,735 B2 | 7/2012 | Wang et al. | |
| 8,752,781 B2 | 6/2014 | Aranda et al. | |
| 2011/0031800 A1 * | 2/2011 | Motozawa | B60R 22/4628 |
| | | | 297/475 |
| 2013/0134251 A1 | 5/2013 | Boyer et al. | |

* cited by examiner

*Primary Examiner* — Sang Kim
(74) *Attorney, Agent, or Firm* — Woods Oviatt Gilman LLP; Katherine H. McGuire, Esq.

(57) ABSTRACT

A ballistic powered inertial reel device comprises an inertia unit and a ballistic powered unit. The inertia unit includes a reel shaft and a webbing wound on the reel shaft. A reel lock has a disengaged orientation with the reel shaft during normal operation and an engaged orientation to prevent rotation of the reel shaft during an emergency. A control dog drives the reel lock. A geared cam rotates to drive a lock rod which operates against the control dog to drive the reel lock into the engaged orientation. The ballistic powered unit comprises a flywheel coupled to the geared cam. A piston drives the flywheel and a rewind spring couples the flywheel to the reel shaft. Actuation of the piston rotates the flywheel to cause the rewind spring to rotate the reel shaft to rewind the webbing and rotate the geared cam to lock the reel lock.

13 Claims, 6 Drawing Sheets

BALLISTIC POWERED INERTIA REEL

BACKGROUND OF THE INVENTION

This invention relates to an inertia reel; more particularly to a ballistic powered inertia reel; and most particularly to a ballistic powered inertia reel including a locking rod to prevent unwinding of the webbing during an emergency.

A wide variety of vehicles use passive-safety devices such as restraints and harnesses. These systems are especially important for fast moving vehicles where they must be capable of fast actuation in order to prevent or lessen the severity of potential undesirable events. These fast moving vehicles can subject the occupants to dangerous forces generated by rapid accelerations/decelerations during unexpected, undesirable events, such as a violent maneuver or a crash. These accelerations/decelerations can lead to large displacements of the occupant's body, which can result in the occupant's body or head contacting structures or objects within the vehicle. This can result in serious injuries or possibly death. Specially designed seats and restraint systems are typically used to restrain the occupant; however, excessive body displacement can still occur during the undesirable events due to the wide range of human body types and sizes.

Restraint systems include inertia reels that are designed to allow movement of the body during normal operation of the vehicle—such as reaching with the arms and turning of the torso while also being designed to lock (preclude webbing payout from the housing) when large accelerations or decelerations are detected. This minimizes the displacement of the seated occupant's body to mitigate the potential for injury. Furthermore, the seated occupant is sometimes out of position or engaged in reaching or turning motions during the onset of an undesirable event. For certain vehicles, such as aircraft which are equipped with occupant ejector seats, these restraint systems may further include rewind mechanics to retract excess payout of the webbing prior to or during initiation of the seat's ejection. In this manner, the occupant's head and torso are secured to the seat before experiencing the violent forces of the ejection where a pilot may experience forces upwards of 20 Gs.

Some inertia reels for use within restraint systems, however, suffer from unwanted payout of the webbing during or immediately following a seat ejection. This may occur when the rewind mechanics have retracted the webbing payout but the webbing reel lock mechanism has failed to lock against unwinding. This unwinding may allow for unwanted and uncontrolled movement of the pilot resulting in pilot injury or death. Furthermore, some ballistic powered inertia reels cannot be unlocked following an ejection to allow the webbing to unwind or allow the pilot to egress the ejection seat. This can be detrimental in instances where a pilot must quickly leave the area.

SUMMARY OF THE INVENTION

The present invention addresses the above needs by providing a ballistic powered inertial reel device generally comprising an inertia unit and a ballistic powered unit. The inertia unit comprises a reel shaft configured to rotate in an unwinding direction and an opposing rewinding direction; a webbing wound on the reel shaft and configured to restrain a user within a seat, the webbing being unwound and rewound upon rotation of the reel shaft; a reel lock mechanism coupled to the reel shaft, the reel lock mechanism being in a disengaged orientation with the reel shaft during normal operation and being in an engaged orientation with the reel shaft to prevent rotation of the reel shaft and unwinding of the webbing during an emergency; a control dog coupled to the reel lock mechanism, the control dog operable to drive the reel lock mechanism from the disengaged orientation to the engaged orientation; a lock rod configured to engage the control dog, the lock rod movable between a disengaged position and an engaged position wherein when in the engaged position the lock rod operates against the control dog to drive the reel lock mechanism into the engaged orientation; and a geared cam coupled to the lock rod, the geared cam rotatable from a first position wherein the lock rod is in the disengaged position to a second position wherein the lock rod is moved to the engaged position.

The ballistic powered unit comprises a flywheel having a smooth portion and a geared portion, the geared portion coupled to the geared cam; a piston adapted to drive the flywheel; and a rewind spring coupling the smooth portion of the flywheel to the reel shaft, wherein actuation of the piston during the emergency rotates the flywheel in a first direction to thereby (i) cause the rewind spring to rotate the reel shaft in the rewind direction to rewind the webbing and secure the user against the seat, and (ii) cause the geared portion to rotate the geared cam from the first position to the second position to lock the reel lock mechanism and prevent rotation of the reel shaft in the unwinding direction.

In a further aspect of the present invention, the reel lock mechanism may include a geared plate and locking dog. The locking dog is pivoted to engage the geared plate when the control dog is driven by the lock rod in the engaged position.

In another aspect of the present invention, a drive mechanism may be coupled between the piston and the flywheel. The drive mechanism may include a ball screw and drive shaft coupled to the flywheel where the ball screw is configured to be driven by the piston to thereby rotate the drive shaft and flywheel.

In yet a further aspect of the present invention, the lock bar may include a paddle extending radially outwardly from the lock bar with the paddle being configured to engage the control dog. The lock bar may further include a biasing member configured to bias the lock bar against the geared cam. The geared cam may further include a recess at a third position with the geared cam being further rotated from the second position to the third position. When in the third position, the lock bar may be biased by the biasing member into the recess so as to disengage the paddle from the control dog while the reel lock mechanism remains in the engaged orientation thereby preventing rotation of the reel shaft. A reset switch may also be coupled to the inertia unit wherein the reset switch is actuatable to return the reel lock mechanism to the disengaged orientation when the geared cam is in the third position.

In another aspect of the present invention, the geared cam may include a stop configured to be engaged by the lock bar to prevent rotation of the flywheel in a second direction opposite the first direction. This may permit tightening of the rewind spring during device assembly.

In a further aspect of the present invention, a ballistic powered inertial reel device generally comprises an inertia unit and a ballistic powered unit. The inertia unit may comprise a reel shaft configured to rotate in an unwinding direction and an opposing rewinding direction; a webbing wound on the reel shaft and configured to restrain a user within a seat, the webbing being unwound and rewound upon rotation of the reel shaft; a reel lock mechanism coupled to the reel shaft, the reel lock mechanism being in a disengaged orientation with the reel shaft during normal operation and being in an engaged orientation with the reel shaft to prevent rotation of the reel shaft and unwinding of the webbing during an emergency; a control dog coupled to the reel lock mechanism, the control dog operable to drive the reel lock mechanism from the disengaged orientation to the engaged orientation; a lock rod including a paddle extending radially outwardly therefrom and configured to engage the control dog, the lock rod including a biasing member and movable between a disengaged position and an engaged position wherein when in the engaged position the paddle operates the control dog to drive the reel lock mechanism into the engaged orientation; and a geared cam having a surface defining a ramp and a recess, the geared cam coupled to the lock rod with the biasing member adapted to bias the lock rod against the surface of the geared cam, the geared cam rotatable from a first position wherein the lock rod is in the disengaged position to a second position wherein the lock rod is moved to the engaged position and further to a third position wherein the lock rod is biased by the biasing member into the recess so as to disengage the paddle from the control dog while the reel lock mechanism remains in the engaged orientation thereby preventing rotation of the reel shaft.

The ballistic powered unit may comprise a flywheel having a smooth portion and a geared portion, the geared portion coupled to the geared cam; a piston adapted to drive the flywheel; and a rewind spring coupling the smooth portion of the flywheel to the reel shaft. Actuation of the piston during the emergency may rotate the flywheel in a first direction to thereby (i) cause the rewind spring to rotate the reel shaft in the rewind direction to rewind the webbing and secure the user against the seat, and (ii) cause the geared portion to rotate the geared cam from the first position to the second position to lock the reel lock mechanism and prevent rotation of the reel shaft in the unwinding direction.

BRIEF DESCRIPTION OF THE DRAWINGS

The invention will further be described, by way of example, with reference to the accompanying drawings.

Similar reference characters refer to similar parts throughout the several views of the drawings.

DETAILED DESCRIPTION

Figure 1A:
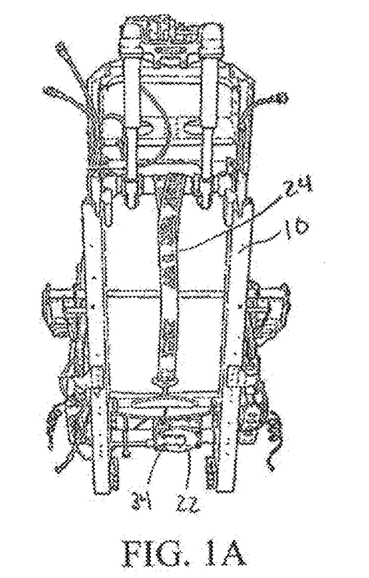
FIGS. 1A and 1B are general environmental views of a pilot injection seat including a ballistic powered inertial reel in accordance with an embodiment of the present invention.
Figure 1B:
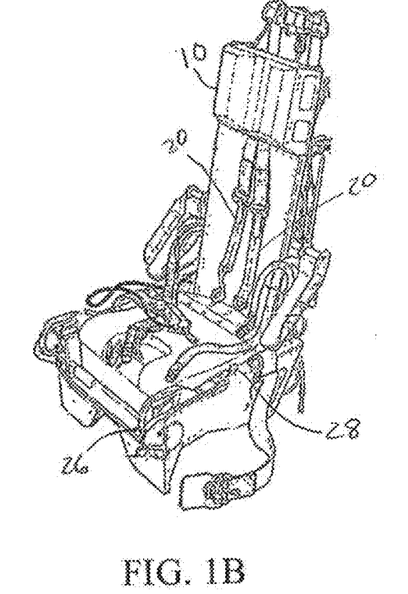
Figure 2:
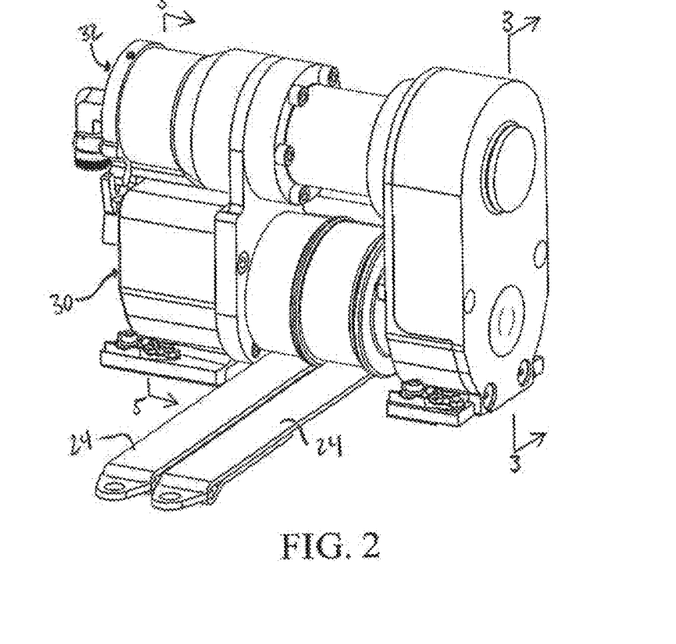
FIG. 2 is a perspective view of a ballistic powered inertial reel in accordance with an embodiment of the present invention.

The general environment in which an embodiment of a ballistic powered inertia reel (BPIR) of the present invention is used is illustrated in FIG. 1. An occupant restraint which typically includes a harness 20 which can be tightened by BPIR 22 that may be rigidly attached to the seat 10 or some other portion of the vehicle structure. One or more straps of webbing 24 may couple BPIR 22 to harness 20 such that retraction of the webbing during an emergency causes the occupant to become securely positioned against the seat back. In the case of a pilot ejection seat, a pilot may pull ejection handle 26 during an emergency to thereby initiate the rocket motors (not shown) used to propel the seat and pilot from the aircraft's cockpit. A bypass off of the rocket motors directs pressurized fluid to a ballistic cartridge 34 coupled to BPIR 22. The pressurized fluid from the rocket motors triggers the ballistic cartridge to produce an explosive high pressure fluid to drive BPIR 22 as discussed in more detail below. A reset lever 28 may be provided for resetting BPIR 22 after an event (with or without an ejection) as will be discussed in more detail below.

Figure 3:
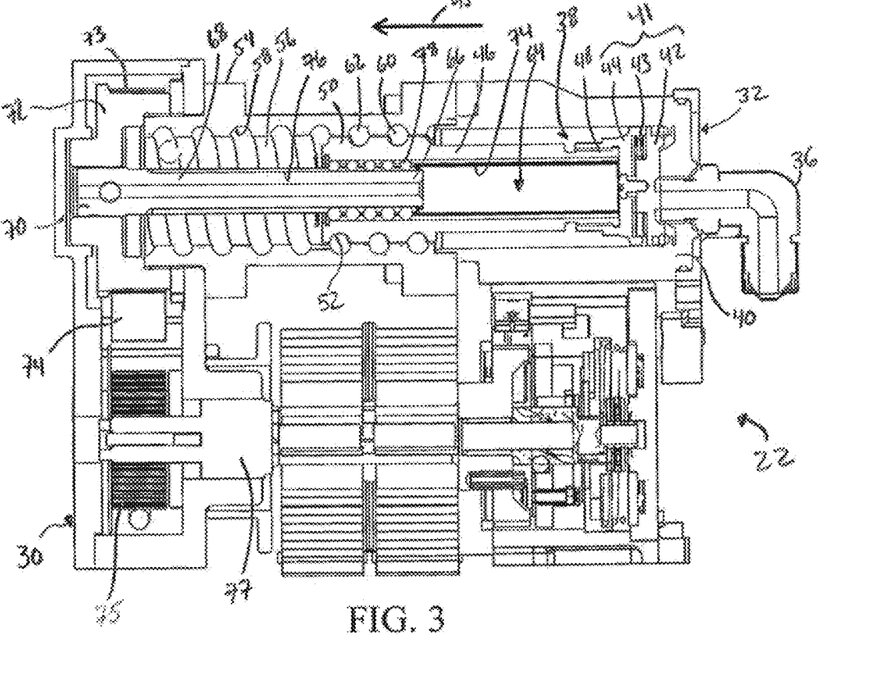
FIG. 3 is a cross-sectional view taken along line 3-3 of FIG. 2.
Figure 4:
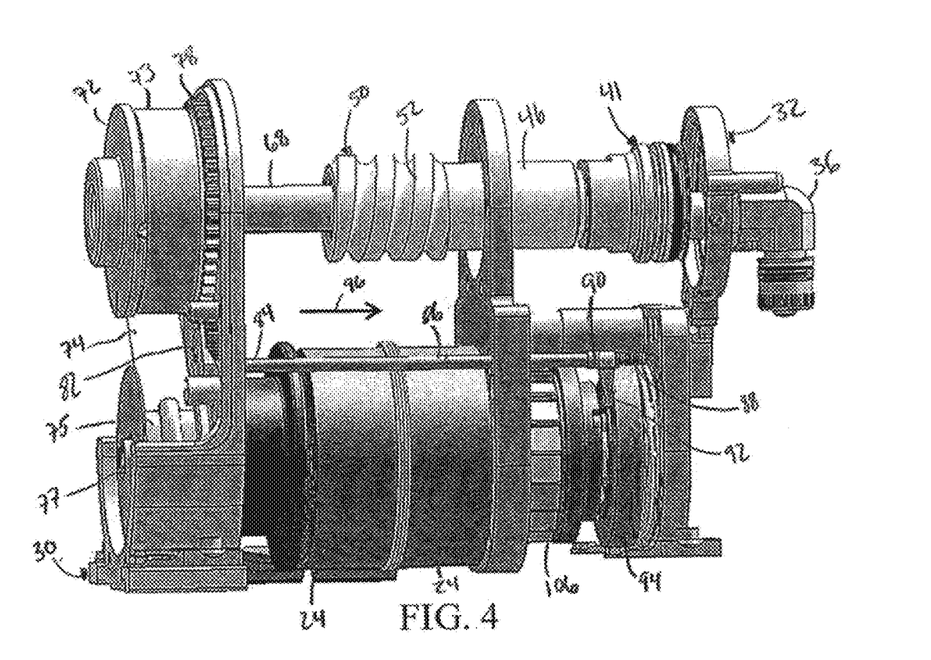
FIG. 4 is a perspective view of the ballistic powered inertial reel of FIG. 2 with device covers removed to show internal components thereof.
Figure 5:
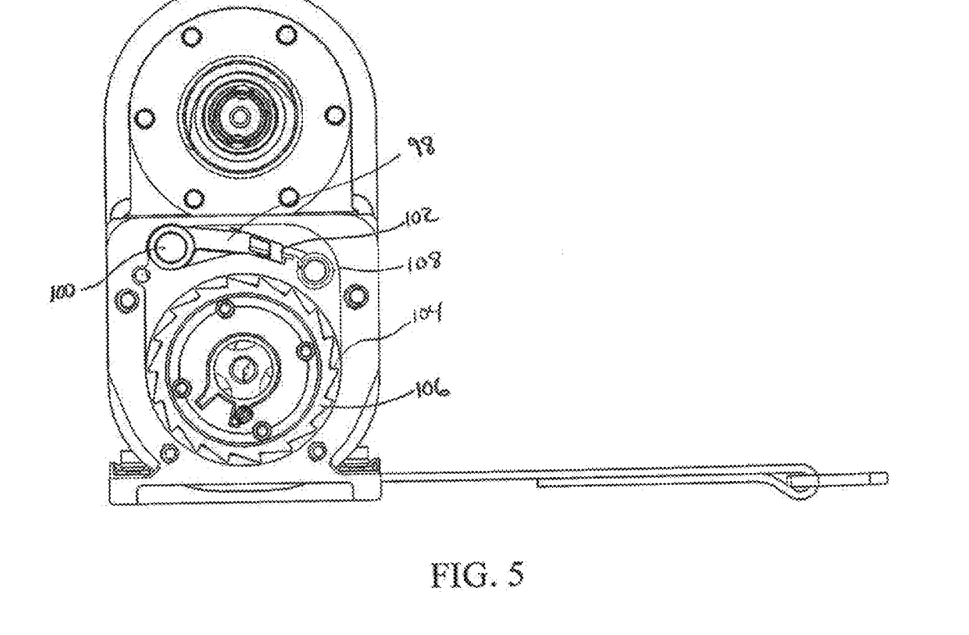
FIG. 5 is a cross sectional view of the ballistic powered inertial reel taken along line 5-5 of FIG. 2.

With reference to FIGS. 2-5, BPIR 22 generally includes an inertia unit 30 and ballistic powered unit 32. In operation, when the pilot manually begins initiation of an ejection, ballistic power unit 32 receives a flow of pressurized fluid such as from ballistic cartridge 34 (see FIG. 1) or other suitable source. Referring now to FIG. 3, the pressurized fluid is delivered through conduit 36 into chamber 38 defined within piston housing 40. Housed with piston housing 40 is a piston assembly 41 comprising a piston 42, roller bearing 43 and stop 44. Upon delivery, the pressurized fluid operates to drive the piston assembly 41 within chamber 38 in the direction generally indicated by arrow 45. Ball screw 46 is coupled to piston 42 at a first end 48 while a second end 50 is configured to include a helical groove 52. Second end 50 resides within shaft housing 54 wherein shaft housing 54 defines a shaft chamber 56 configured to include a helical groove 58. Helical groove 52 of ball screw 46 and helical groove 58 of shaft housing 54 are arranged such that the paired grooves create a helical bore 60 having a generally circular cross-section. One or more ball bearings 62 may reside within helical bore 60 such that, as piston 42 is driven in the direction indicated by arrow 45, roller bearing 43 and stop 44 translate the linear motion of piston 42 into rotary motion which results as ball screw rotates about ball bearing(s) 62 within bore 60.

Ball screw 46 also defines a hollow cavity 64 which is configured to slidingly receive a first end 66 of drive shaft 68. The opposing end 70 of drive shaft 68 is secured to a flywheel 72. The internal wall of ball screw 46 defines a groove 74 which mates with a groove 76 defined on the external surface of drive shaft 68. Nested within the mated grooves 74/76 is a bearing cage and associated ball bearings 78. In this manner, ball screw 46 is free to advance along the length of drive shaft 68 due to the rolling interface afforded by ball bearings 78. Ball bearings 78 also translate the rotational motion experienced by ball screw 46 as it rotates within shaft housing 54 so as to rotate shaft 68 such that drive shaft 68 operates to turn flywheel 72.

Wound about flywheel 72 is one end 73 of rewind spring 74. The opposing end 75 of rewind spring 74 is wound about reel shaft 77 within inertia unit 30. During normal operation, opposing end 75 of rewind spring 74 retracts webbing 24 on reel shaft 77 such that webbing 24 fits snuggly against the occupant without unduly inhibiting free movement of the occupant. However, once ballistic cartridge 34 has been fired, flywheel 72 rotates clockwise (CW) causing end 73 of rewind spring 74 to drive reel shaft 77 in a counterclockwise (CCW) direction to thereby rewind webbing 24 to secure the occupant within his or her seat as described above.

Flywheel 72 also includes a geared portion 78 configured to mate with corresponding teeth 80 on geared cam 82. A first end 84 of lock rod 86 rests against cammed face 113 of geared cam 82 (see FIG. 6) by a biasing force applied by biasing member 88 (such as a coil spring) against second end 90 of lock rod 86. Second end 90 may further include a paddle 92 extending radially outwardly therefrom. Paddle 92 is configured to rest against or nearly touch a control dog 94. In this manner, CW rotation of flywheel 38 causes CCW rotation of geared cam 82 thereby driving lock rod 84 in the direction generally indicated by arrow 96 such that paddle 92 impacts and drives control dog 94. Control dog 94, in turn, operates to trigger a locking mechanism wherein a locking dog 98 pivots about pivot 100 so as to position dog end 102 against tooth 104 of geared plate 106 formed on reel shaft 77 (see FIG. 5). With locking dog 98 secured against geared plate 106, rotation of reel shaft 77 is prevented thereby prohibiting payout of webbing 24. In accordance with an aspect of the invention, locking dog 98 will remain engaged with geared plate 106 until control dog 94 is rotated by reset lever 28 thereby returning locking dog 98 to its unengaged position (such as that shown in FIG. 5).

Figure 6:
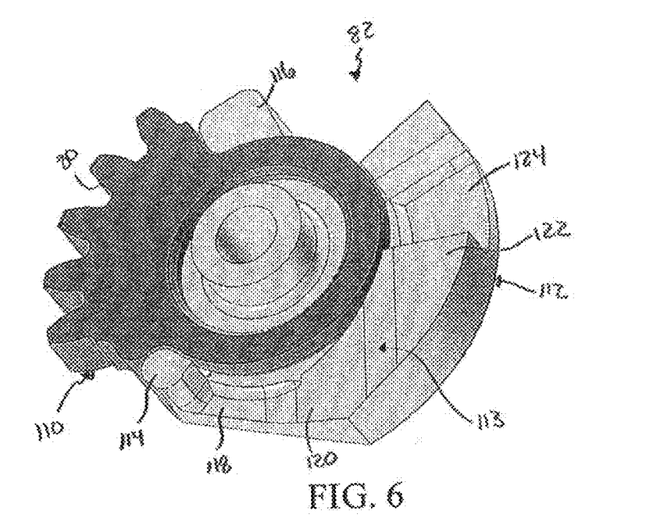
FIG. 6 is an expanded view of a geared cam of a ballistic powered inertial reel in accordance with an embodiment of the present invention.

FIG. 6 is an isolated perspective view of geared cam 82 and generally includes a gear portion 110 and a cam portion 112 defining cammed face 113. Each of these portions may be constructed as separate pieces or may be fabricated as a solitary unit. As shown in FIG. 6, geared portion 110 is configured to nest between a stop 114 and post 116 on cam portion 112. In this manner, as teeth 80 of gear portion 110 are engaged by geared portion 78 of flywheel 72 as discussed above, driving of gear portion 110 operates to rotate cam portion 112 of geared cam 82. Cammed face 133 on cam portion 112 includes a lower platform 118 and a ramped portion 120 leading to an upper plateau 122. Cam portion 112 may further include a recess 124 defined within a portion of upper plateau 122. These features will be described in more detail with reference to FIGS. 7-12.

Figure 7:
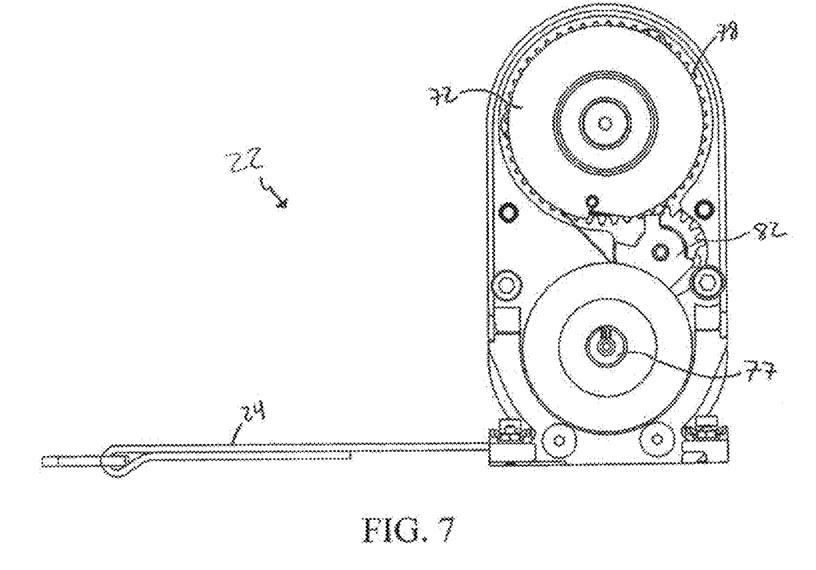
FIG. 7 is a side cross sectional view of a ballistic powered inertial reel in the normal operation/non-actuated orientation.
Figure 8:
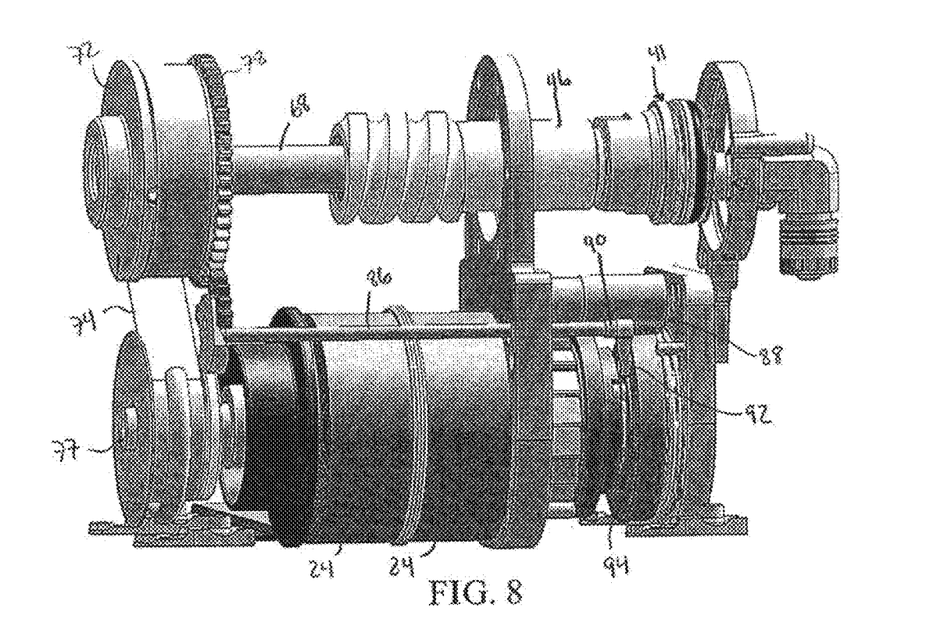
FIG. 8 is a perspective view of the ballistic powered inertial reel of FIG. 7 with device covers removed to show internal components thereof.

FIGS. 7 and 8 show BPIR 22 in its normal operating condition wherein reel shaft 77 is freely rotatable to permit unwinding/rewinding of webbing 24. End 75 of rewind spring 74 possesses sufficient tension to enable unwinding/rewinding of webbing 24 without causing rotation of flywheel 72 or geared cam 82. In this manner, lock rod 86 is biased against geared cam 82 by biasing member 88 such that first end 84 resides on lower platform 118 of geared cam 82. With first end 84 resting against lower platform 118, paddle 92 located on the second end 90 is positioned immediately adjacent to, or in some embodiments very nearly touching, control dog 94. Control dog 94 inhibits pivoting of locking dog 98 such that geared plate 106 and reel shaft 77 are free to rotate as needed.

Figure 9:
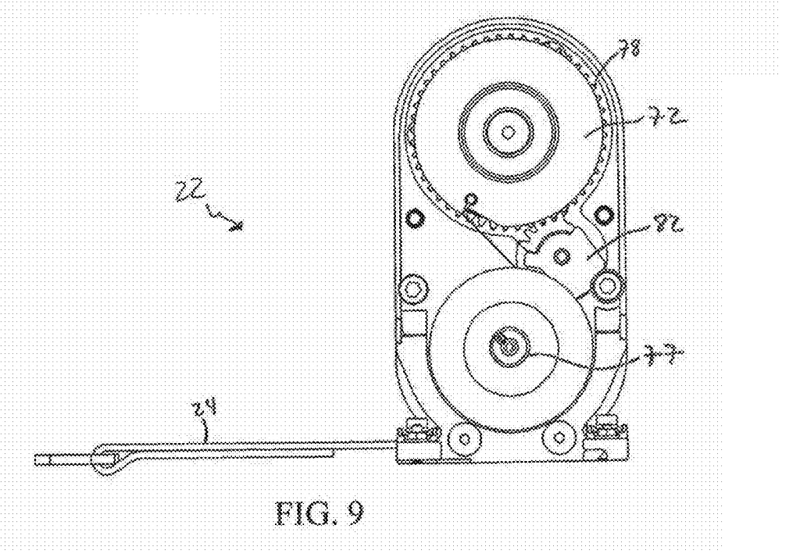
FIG. 9 is a side cross sectional view of a ballistic powered inertial reel in the actuated/locked orientation.
Figure 10:
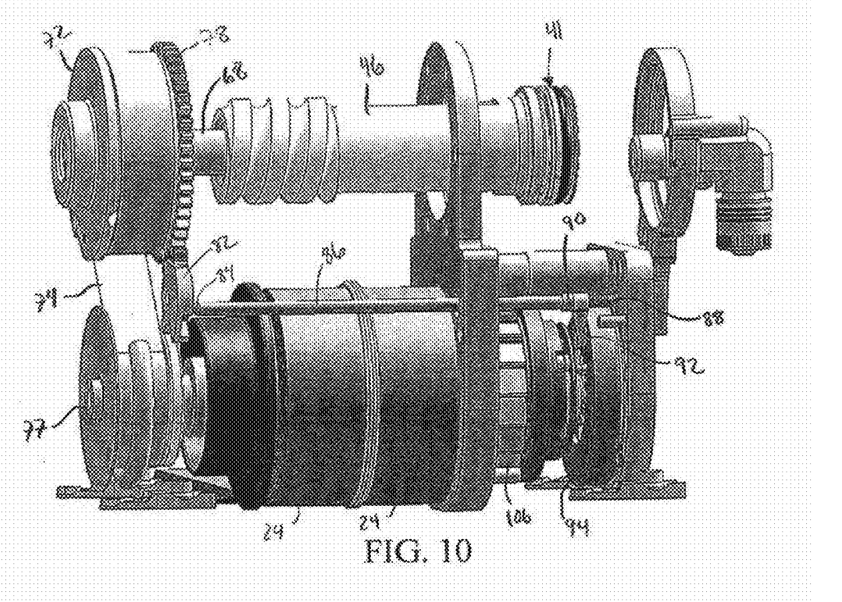
FIG. 10 is a perspective view of the ballistic powered inertial reel of FIG. 7 with device covers removed to show internal components thereof.

Turning now to FIGS. 9 and 10, piston assembly 41 has been actuated (such as by firing ballistic cartridge 38 as discussed above), such that piston 42 and ball screw 46 have traveled an intermediate distance within chamber 38 of piston housing 40 (see FIG. 3). It should be understood that once actuated with sufficient pressure, piston 42 (and ball screw 46) will travel the entire length of chamber 38. FIGS. 9 and 10 are snapshots of BPIR 22 at some single point in time during such travel. In accordance with an aspect of the present invention, the total travel time of the piston (and thus the resultant locking actions of the BPIR) are completed in less than about 1 second, and more particularly within about 10 to about 300 milliseconds, from the initiation of ballistic cartridge 34.

Returning to FIGS. 9 and 10, linear/rotational travel of ball screw 46 (as described above) rotates drive shaft 68 which in turn rotates flywheel 72. Rotation of flywheel 72 rewinds webbing 24 on reel shaft 77. Rotation of flywheel 72 simultaneously rotates geared portion 78. Geared portion 78, in turn, engages geared portion 110 of geared cam 82 to drive geared cam 82 in CCW rotation. As geared cam 82 rotates, lock rod 86 rides up ramped portion 120 to upper plateau 122 of cam portion 112 thereby imparting linear displacement of lock rod 86 (in the direction indicated by arrow 94 in FIG. 4) and causing second end 90 of lock rod 86 to impact control dog 94. Control dog 94 is then displaced a sufficient distance so as to enable pivoting of locking dog 98 whereby locking dog 98 engages geared plate 106 as described above, thereby preventing unwanted payout of webbing 24.

Figure 11:
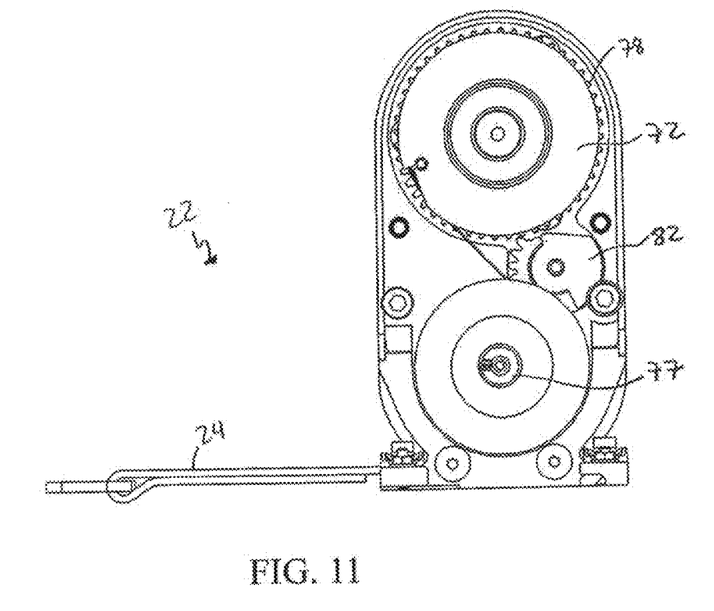
FIG. 11 is a side cross sectional view of a ballistic powered inertial reel in the actuated/unlocked orientation.
Figure 12:
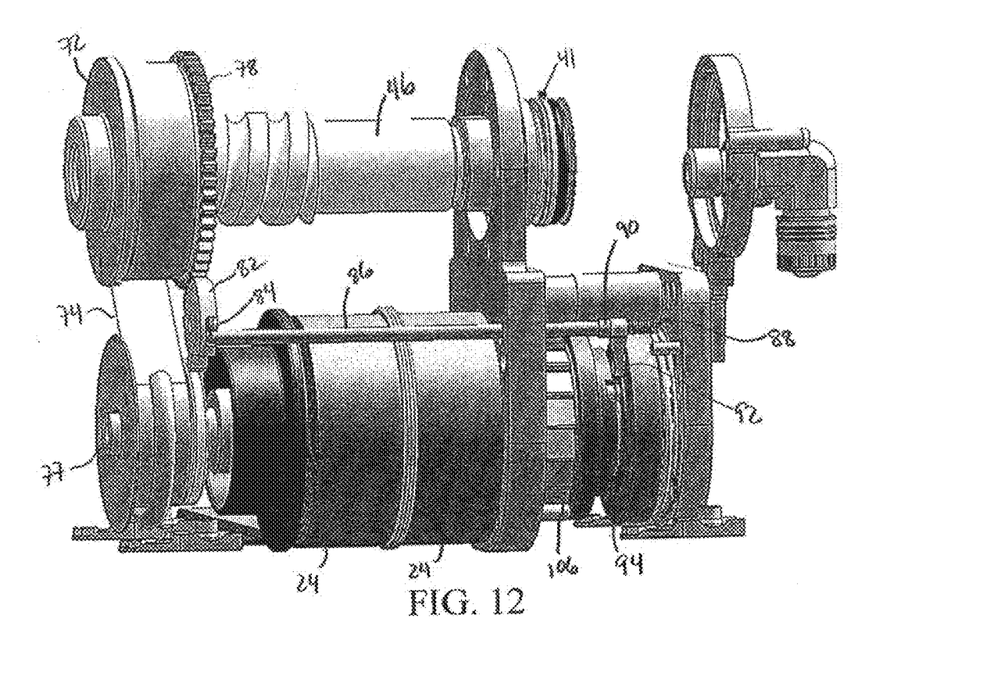
FIG. 12 is a perspective view of the ballistic powered inertial reel of FIG. 7 with device covers removed to show internal components thereof.

With reference to FIGS. 11 and 12, piston 42 and ball screw 46 have traveled their maximum distance within chamber 38 of piston housing 40. As piston 42 and ball screw have continued to travel, such as from their positions shown in FIG. 10, flywheel 72 has continued to rewind webbing 24 on reel shaft 77 so as to pull back and securely position the occupant within his or her seat. Geared cam 82 has also continued its CCW rotation such that lock rod 86 has traversed upper plateau 122 and first end 84 of lock rod 86 coincides with recess 124. Biasing member 88 then biases lock rod 86 away from control dog 94 (in a direction opposite that indicated by arrow 94 in FIG. 4) so that first end 84 resides within recess 124. Locking dog 98 may then be manually reset (withdrawn from engagement with geared plate 106), such as through use of reset lever 28, so that reel shaft 77 is freely rotatable to unwind/rewind webbing 24 as desired or needed.

Seating lock rod 86 within recess 124 further inhibits the possibility for bounced back, or reverse rotation, of geared cam 82. In this manner, jamming or binding of geared cam 82 with geared portion 78 of flywheel 72 is prevented. As a result, following actuation of ballistic power unit 32 during an emergency and the subsequent resetting of locking dog 98, BPIR 22 may continue to function as a standard webbing reel but will lack the additional functions provided by a non-actuated ballistic power unit. In accordance with an aspect of the present invention, geared portion 110 of geared cam 82 is configured to disengage with geared portion 78 upon full travel of piston 42.

In a further aspect of the present invention, cam portion 112 includes a stop 114 that is configured to engage with first end 84 of lock rod 86 upon clockwise rotation of geared cam 82 so as to prevent counter clockwise rotation of flywheel 72. In this manner, rewind spring can be turned during assembly in order be tightened to have a desired amount of spring tension. Successive BPIR devices may likewise have controlled loading of their respective rewind springs such that each spring is tightened to the same tension or number of rotations on each unit. As a result, the pull-back force (the rewind force applied to the reel shaft during an emergency to secure the occupant) of the BPIR device may be standardized from one unit to the next.

Although the invention has been described with reference to preferred embodiments thereof, it is understood that various modifications may be made thereto without departing from the full spirit and scope of the invention as defined by the claims which follow. While specific reference has been made to rotational movements of device components, it should be understood by those skilled in the art that such rotations may be reversed and that such teachings are within the scope of the present invention.

The invention claimed is:

1. A ballistic powered inertial reel device, comprising:
   a) an inertia unit comprising:
      i) a reel shaft configured to rotate in an unwinding direction and an opposing rewinding direction;
      ii) a webbing wound on the reel shaft and configured to restrain a user within a seat, the webbing being unwound and rewound upon rotation of the reel shaft;
      iii) a reel lock mechanism coupled to the reel shaft, the reel lock mechanism being in a disengaged orientation with the reel shaft during normal operation and being in an engaged orientation with the reel shaft to prevent rotation of the reel shaft and unwinding of the webbing during an emergency;
      iv) a control dog coupled to the reel lock mechanism, the control dog operable to drive the reel lock mechanism from the disengaged orientation to the engaged orientation;
      v) a lock rod configured to engage the control dog, the lock rod movable between a disengaged position and an engaged position wherein when in the engaged position the lock rod operates against the control dog to drive the reel lock mechanism into the engaged orientation; and
      vi) a geared cam coupled to the lock rod, the geared cam rotatable from a first position wherein the lock rod is in the disengaged position to a second position wherein the lock rod is moved to the engaged position; and
   b) a ballistic powered unit comprising:
      i) a flywheel having a smooth portion and a geared portion, the geared portion coupled to the geared cam;
      ii) a piston adapted to drive the flywheel; and
      iii) a rewind spring coupling the smooth portion of the flywheel to the reel shaft,
   wherein actuation of the piston during the emergency rotates the flywheel in a first direction to thereby (i) cause the rewind spring to rotate the reel shaft in the rewind direction to rewind the webbing and secure the user against the seat, and (ii) cause the geared portion to rotate the geared cam from the first position to the second position to lock the reel lock mechanism and prevent rotation of the reel shaft in the unwinding direction.

2. The ballistic powered inertial reel device of claim 1, wherein the reel lock mechanism includes a geared plate and locking dog, the locking dog pivoted to engage the geared plate when the control dog is driven by the lock rod in the engaged position.

3. The ballistic powered inertial reel device of claim 1, wherein a drive mechanism is coupled between the piston and the flywheel, the drive mechanism including a ball screw and a drive shaft coupled to the flywheel, the ball screw configured to be driven by the piston to thereby rotate the drive shaft and flywheel.

4. The ballistic powered inertial reel device of claim 1, wherein the piston is actuated by a ballistic cartridge.

5. The ballistic powered inertial reel device of claim 4, wherein actuation of the ballistic cartridge is manually initiated by the user.

6. The ballistic powered inertial reel device of claim 1, wherein the lock bar includes a paddle extending radially outwardly from the lock bar, the paddle directly configured to engage the control dog.

7. The ballistic powered inertial reel device of claim 6, wherein the lock bar further includes a biasing member configured to bias the lock bar against the geared cam.

8. The ballistic powered inertial reel device of claim 7, wherein the geared cam includes a recess at a third position, the geared cam being further rotated from the second position to the third position wherein the lock bar is biased by the biasing member into the recess so as to disengage the paddle from the control dog while the reel lock mechanism remains in the engaged orientation thereby preventing rotation of the reel shaft.

9. The ballistic powered inertial reel device of claim 8, wherein a reset switch is coupled to the inertia unit wherein the reset switch is actuatable to return the reel lock mechanism to the disengaged orientation when geared cam is in the third position.

10. The ballistic powered inertial reel device of claim 1, wherein the geared cam includes a stop configured to be engaged by the lock bar to prevent rotation of flywheel in a second direction opposite the first direction thereby permitting tightening of the rewind spring.

11. A ballistic powered inertial reel device, comprising:
   a) an inertia unit comprising:
      i) a reel shaft configured to rotate in an unwinding direction and an opposing rewinding direction;
      ii) a webbing wound on the reel shaft and configured to restrain a user within a seat, the webbing being unwound and rewound upon rotation of the reel shaft;
      iii) a reel lock mechanism coupled to the reel shaft, the reel lock mechanism being in a disengaged orientation with the reel shaft during normal operation and being in an engaged orientation with the reel shaft to prevent rotation of the reel shaft and unwinding of the webbing during an emergency;
      iv) a control dog coupled to the reel lock mechanism, the control dog operable to drive the reel lock mechanism from the disengaged orientation to the engaged orientation;
      v) a lock rod including a paddle extending radially outwardly therefrom and configured to engage the control dog, the lock rod including a biasing member and movable between a disengaged position and an engaged position wherein when in the engaged position the paddle operates against the control dog to drive the reel lock mechanism into the engaged orientation; and
      vi) a geared cam having a surface defining a ramp and a recess, the geared cam coupled to the lock rod with the biasing member adapted to bias the lock rod against the surface of the geared cam, the geared cam rotatable from a first position wherein the lock rod is in the disengaged position to a second position wherein the lock rod is moved to the engaged position and further to a third position wherein the lock rod is biased by the biasing member into the recess so as to disengage the paddle from the control dog while the reel lock mechanism remains in the engaged orientation thereby preventing rotation of the reel shaft; and b) a ballistic powered unit comprising:
  i) a flywheel having a smooth portion and a geared portion, the geared portion coupled to the geared cam;
  ii) a piston adapted to drive the flywheel; and
  iii) a rewind spring coupling the smooth portion of the flywheel to the reel shaft, wherein actuation of the piston during the emergency rotates the flywheel in a first direction to thereby (i) cause the rewind spring to rotate the reel shaft in the rewind direction to rewind the webbing and secure the user against the seat, and (ii) cause the geared portion to rotate the geared cam from the first position to the second position to lock the reel lock mechanism and prevent rotation of the reel shaft in the unwinding direction.

12. The ballistic powered inertial reel device of claim 11, wherein a reset switch is coupled to the inertia unit wherein the reset switch is actuatable to return the reel lock mechanism to the disengaged orientation when geared cam is in the third position.

13. The ballistic powered inertial reel device of claim 11, wherein the geared cam includes a stop configured to be engaged by the lock bar to prevent rotation of flywheel in a second direction opposite the first direction thereby permitting tightening of the rewind spring.

* * * * *